United States Patent
Hozuki et al.

(10) Patent No.: US 9,998,043 B2
(45) Date of Patent: Jun. 12, 2018

(54) ROTARY MACHINE CONTROLLER

(71) Applicant: Mitsubishi Electric Corporation, Chiyoda-ku (JP)

(72) Inventors: Takashi Hozuki, Chiyoda-ku (JP); Hisanori Yamasaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 141 days.

(21) Appl. No.: 14/767,665

(22) PCT Filed: Apr. 10, 2013

(86) PCT No.: PCT/JP2013/060809
§ 371 (c)(1),
(2) Date: Aug. 13, 2015

(87) PCT Pub. No.: WO2014/167667
PCT Pub. Date: Oct. 16, 2014

(65) Prior Publication Data
US 2016/0013738 A1  Jan. 14, 2016

(51) Int. Cl.
*H02P 21/34* (2016.01)
*H02P 6/28* (2016.01)
(Continued)

(52) U.S. Cl.
CPC ............... *H02P 6/10* (2013.01); *H02P 21/05* (2013.01); *H02P 21/20* (2016.02); *H02P 21/22* (2016.02); *H02P 2207/05* (2013.01)

(58) Field of Classification Search
CPC ...... H02P 21/0035; H02P 6/28; G05B 19/404
(Continued)

(56) References Cited

U.S. PATENT DOCUMENTS 5,525,877 A * 6/1996 Umida ............... H02P 23/16
318/432
2006/0113946 A1* 6/2006 Okita ................. G05B 19/404
318/651
(Continued)

FOREIGN PATENT DOCUMENTS

JP          2928594 B2    8/1999
JP     2006-288076 A    10/2006
(Continued)

OTHER PUBLICATIONS

Korean Office Action dated Jan. 18, 2017 in Patent Application No. 10-2015-7027854 (with partial English translation).
(Continued)

*Primary Examiner* — Jorge L Carrasquillo
*Assistant Examiner* — Cortez Cook
(74) *Attorney, Agent, or Firm* — Oblon, McClelland, Maier & Neustadt, L.L.P.

(57) ABSTRACT

An estimation unit estimates a q-axis induced-voltage estimation value and estimation torque of a PM motor. An adder adds a torque command and a first command together. The first command is calculated at a first command generation unit based on the estimation torque. A further adder adds a q-axis voltage command and a second command together. The second command is calculated at a second command generation unit based on the q-axis induced-voltage estimation value. The first and second command generation units compensate a control delay in a current control system including a current control unit and an estimation delay in the estimation unit for the estimation torque and an estimation induced voltage of the PM motor, and thereby a lack of the q-axis voltage command in a high frequency range is compensated, reducing a torque ripple effectively over a wide range of speed up to a high speed range.

20 Claims, 7 Drawing Sheets

(51) Int. Cl.
  *H02P 21/14* (2016.01)
  *H02P 6/10* (2006.01)
  *H02P 21/05* (2006.01)
  *H02P 21/22* (2016.01)
  *H02P 21/20* (2016.01)

(58) Field of Classification Search
  USPC .................................... 318/400.02, 400.23
  See application file for complete search history.

(56) References Cited

U.S. PATENT DOCUMENTS

| | | | |
|---|---|---|---|
| 2006/0145639 A1* | 7/2006 | Song | H02P 6/28 318/400.26 |
| 2009/0021194 A1 | 1/2009 | Tonami et al. | |
| 2009/0028532 A1* | 1/2009 | El-Antably | H02P 6/10 388/819 |
| 2012/0139459 A1* | 6/2012 | Lim | H02P 21/0017 318/400.02 |

FOREIGN PATENT DOCUMENTS

| | | |
|---|---|---|
| KR | 10-2005-0072684 A | 7/2005 |
| KR | 10-2013-0030754 A | 3/2013 |

OTHER PUBLICATIONS

International Search Report dated Jun. 4, 2013, in PCT/JP2013/060809, filed Apr. 10, 2013.

\* cited by examiner

ROTARY MACHINE CONTROLLER

TECHNICAL FIELD

The present invention relates to a rotary machine controller that reduces a torque ripple produced during rotation of a rotary machine.

BACKGROUND ART

A PM motor (Permanent Magnet Synchronous Motor) as a rotary machine has features of being compact and highly efficient, and has recently been widely used for industrial equipment and the like. However, because of its structure, the PM motor contains a harmonic component in its induced voltage and thus has a torque ripple in its produced torque. This may result in causing a problem of vibration, noise, mechanical resonance, or the like, so that a reduction technique of the ripple becomes necessary.

As the reduction technique, there is known that which reduces a torque ripple by overlapping a compensation signal for reducing the torque ripple on a current command (see, for example, Patent Document 1).

CITATION LIST

Patent Document

Patent Document 1: Japanese Patent Application Laid-open No. 2006-288076

SUMMARY OF THE INVENTION

Problems to be Solved by the Invention

Since the conventional rotary machine controller is configured as described above and serves to reduce a torque ripple by overlapping the compensation signal on the current command, there is a problem that, when a control-frequency range of its current control unit falls below the frequency range of the torque ripple to be reduced, the compensation signal according to an instruction could not be outputted, so that the torque-ripple reducing ability is degraded. Because the frequency of the torque ripple increases in proportion to the rotation speed of the PM motor, this problem is of particular importance when the motor is rotating at a high speed.

This invention has been made to solve the problem as described above, and an object thereof is to provide a rotary machine controller capable of reducing a torque ripple more effectively over a wide range of speed.

Means for Solving the Problems

The rotary machine controller according to the invention is a rotary machine controller which comprises a torque compensation unit, a current control unit, a voltage command generation unit and a phase compensation unit, and controls a rotary machine using a driving voltage that is applied thereto through a power converter according to a three-phase driving-voltage command outputted from the voltage command generation unit, wherein the torque compensation unit has a voltage estimation unit, a torque estimation unit, a first command generation unit and a second command generation unit, and wherein:

the voltage estimation unit serves to estimate an estimation induced voltage of the rotary machine on the basis of an actual current flowing in the rotary machine and the driving voltage;

the torque estimation unit serves to estimate an estimation torque of the rotary machine on the basis of the estimation induced voltage and the actual current;

the first command generation unit serves to generate a first command for reducing a torque ripple of the rotary machine, on the basis of the estimation torque;

the second command generation unit serves to generate a second command for reducing the torque ripple of the rotary machine, on the basis of the estimation induced voltage;

the current control unit serves to compensate using the first command, a difference between a q-axis current command for ordering a current to be supplied from the power converter to the rotary machine and the actual current to thereby generate a q-axis voltage command;

the voltage command generation unit serves to compensate the q-axis voltage command using the second command to thereby generate the three-phase driving-voltage command on the basis of the compensated q-axis voltage command; and the phase compensation unit serves to compensate at least one of the first command and the second command to thereby compensate at least one of a control delay in a current control system including the current control unit and an estimation delay in the torque estimation unit.

Effect of the Invention

Since the rotary machine controller according to the invention is configured as described above, it is possible to provide a rotary machine controller capable of reducing a torque ripple more effectively over a wide range of speed.

MODES FOR CARRYING OUT THE INVENTION

Embodiment 1

Figure 1:
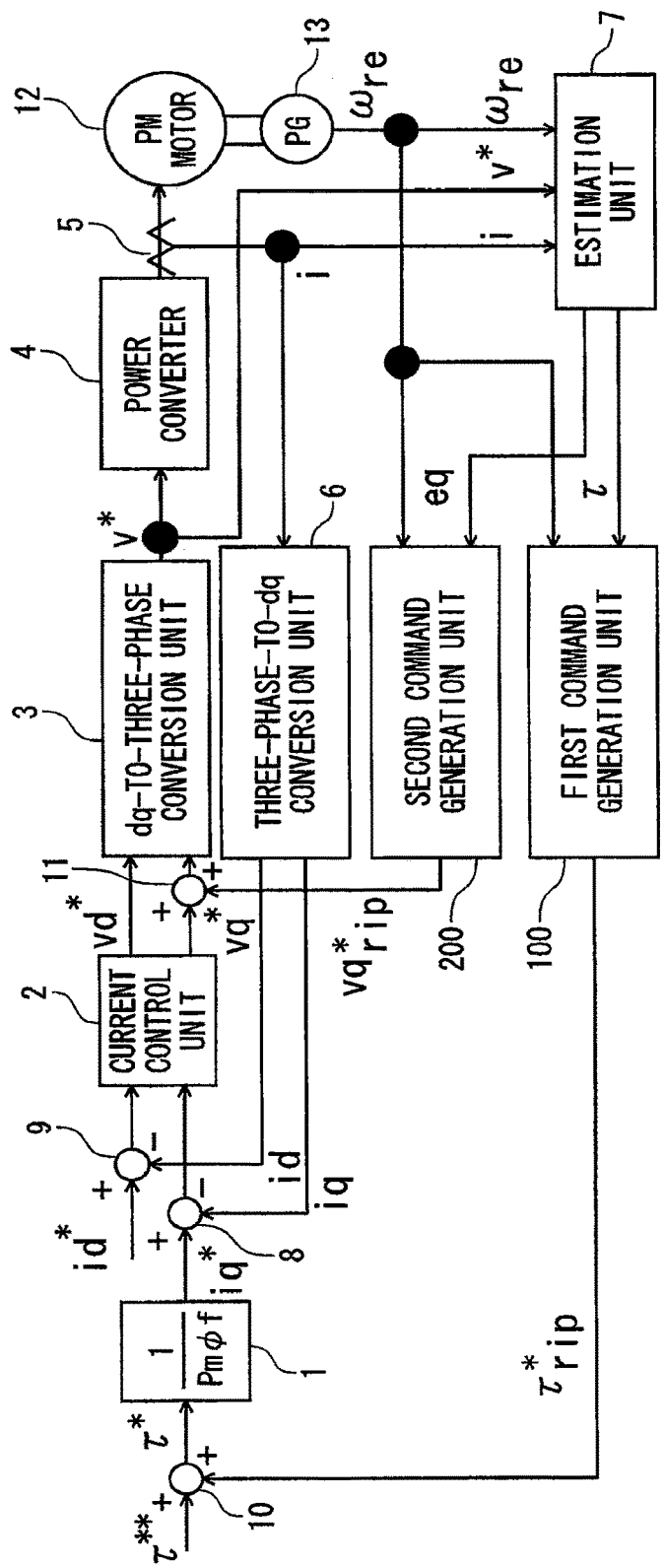
FIG. 1 is a block diagram showing a configuration of a rotary machine controller given as Embodiment 1 of the invention.
Figure 2:
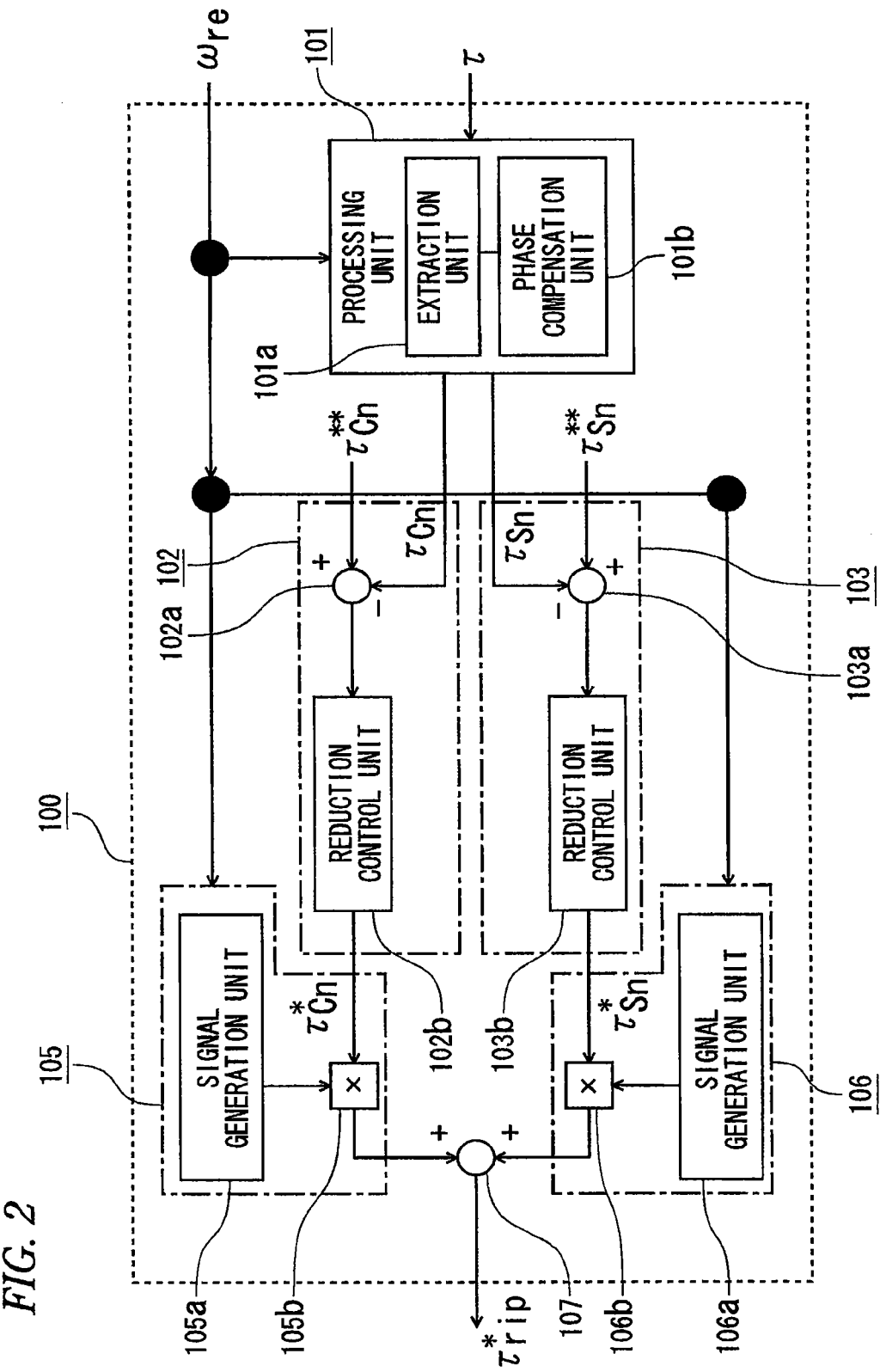
FIG. 2 is a block diagram showing a detailed configuration of a first command generation unit in FIG. 1.
Figure 3:
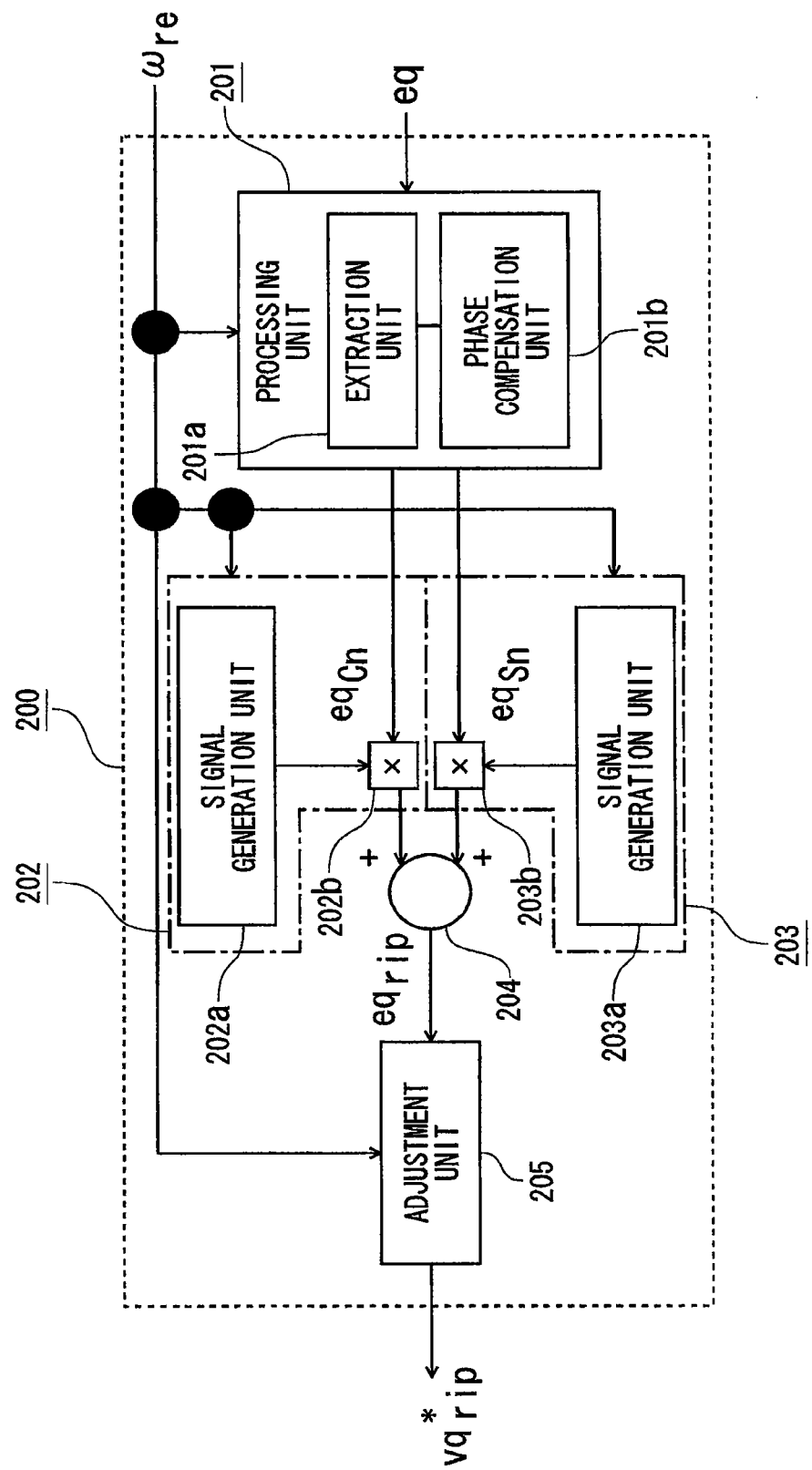
FIG. 3 is a block diagram showing a detailed configuration of a second command generation unit in FIG. 1.
Figure 4:
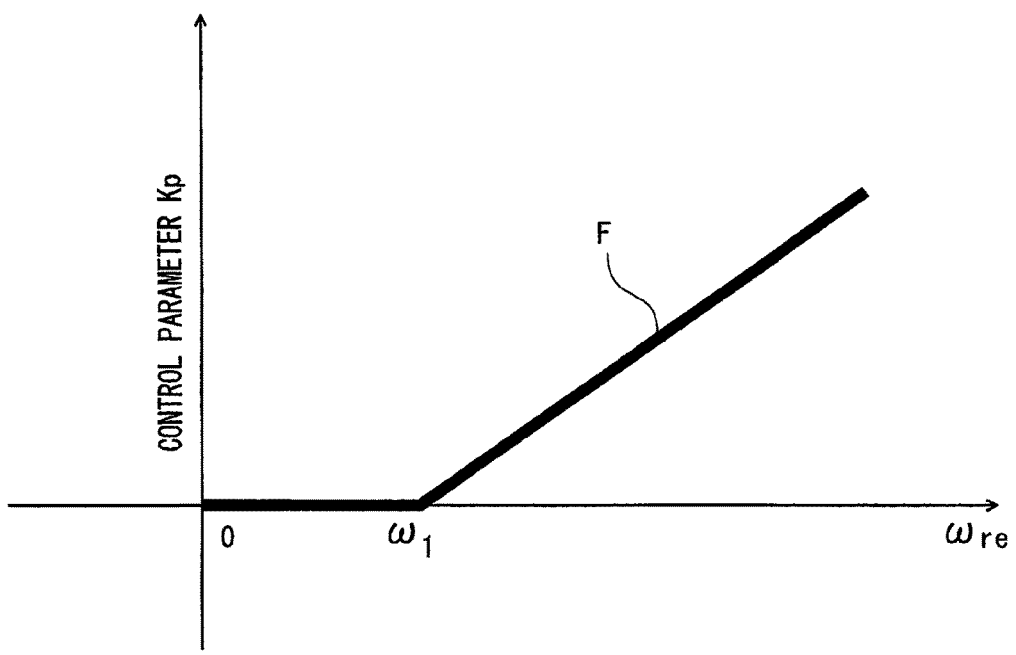
FIG. 4 is a graph for explaining about setting of a control parameter Kp in FIG. 3.
Figure 5:
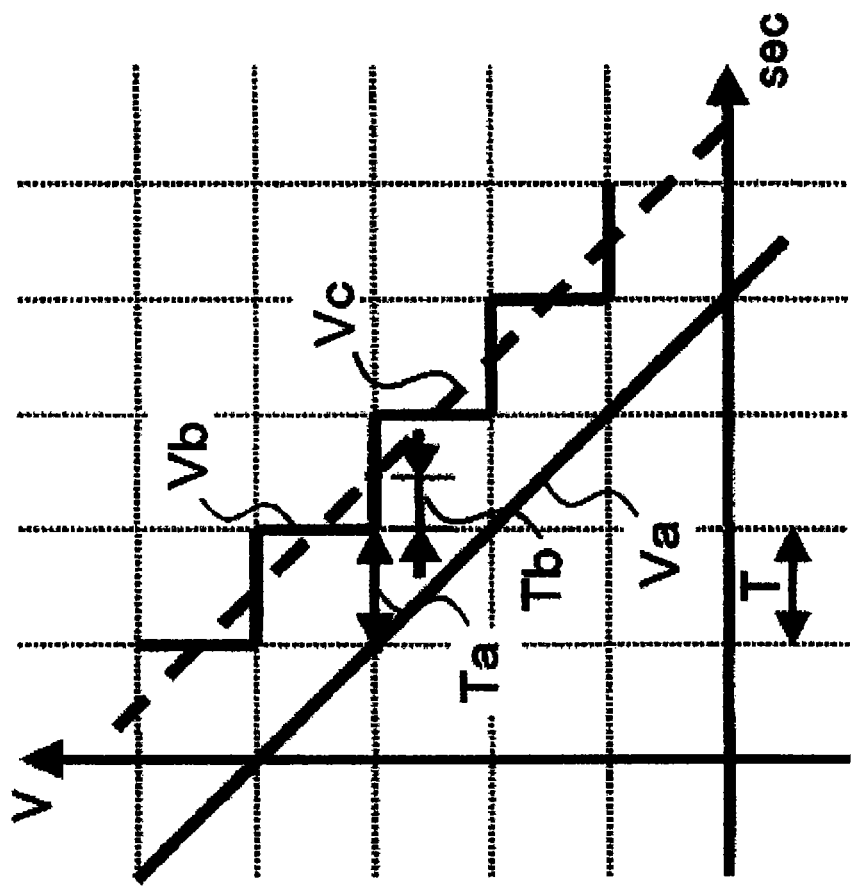
FIG. 5 is a voltage waveform chart for explaining a phase delay in a power converter to be compensated by the invention.
Figure 6:
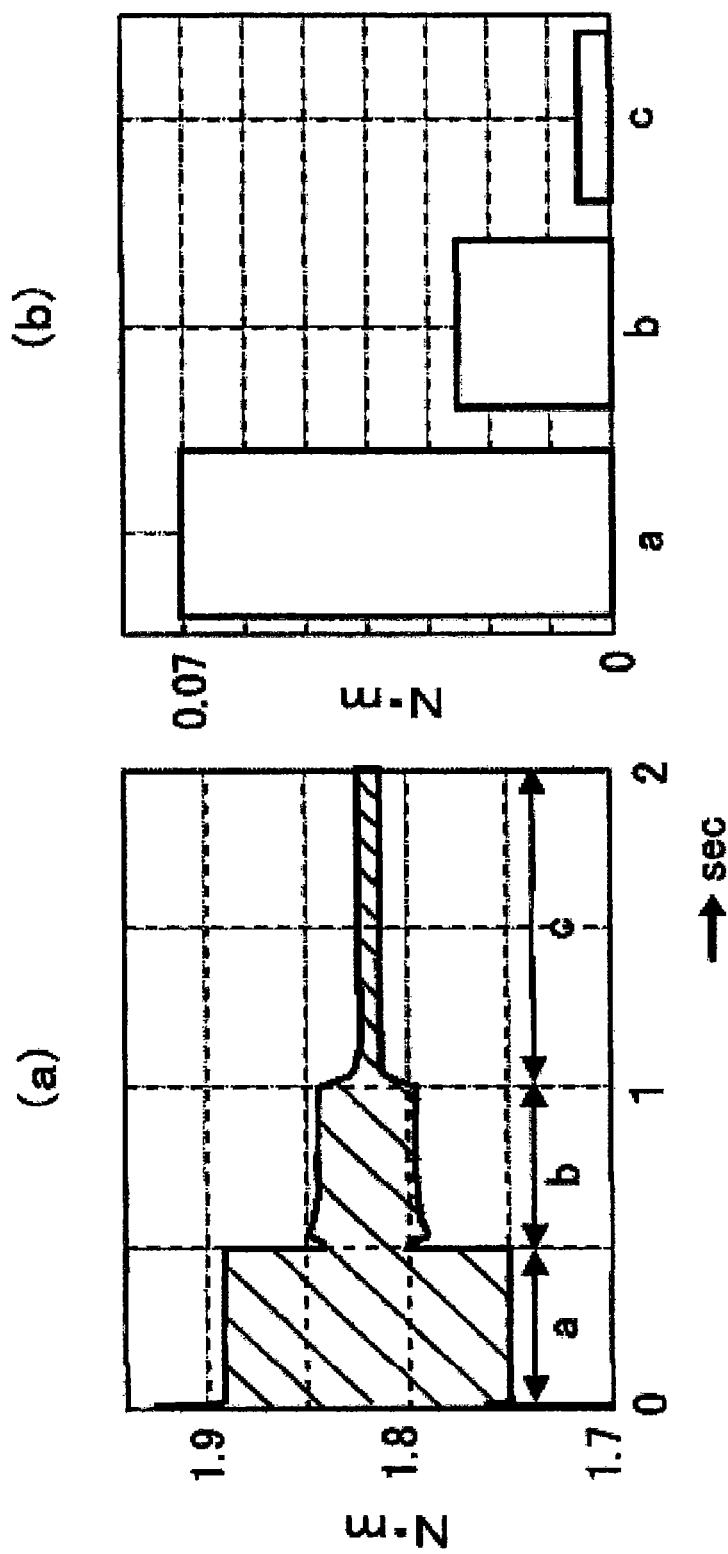
FIG. 6 is graphs showing a simulation result in a case where a torque-ripple reduction control is performed by the rotary machine controller shown in FIG. 1.

FIG. 1 to FIG. 6 are provided for showing Embodiment 1 for carrying out the invention, in which FIG. 1 is a block diagram showing a configuration of a rotary machine controller, FIG. 2 is a block diagram showing a detailed configuration of a first command generation unit in FIG. 1 and FIG. 3 is a block diagram showing a detailed configuration of a second command generation unit in FIG. 1. FIG. 4 is a graph for explaining about setting of a control parameter Kp in FIG. 3, FIG. 5 is a voltage waveform chart for explaining a phase delay in a power converter to be compensated by the invention, and FIG. 6 is graphs showing a simulation result in a case where a torque-ripple reduction control is performed by the rotary machine controller shown in FIG. 1.

In FIG. 1, the rotary machine controller has a current command generation unit 1, a current control unit 2, a dq-to-three-phase conversion unit 3, a current detection unit 5, a three-phase-to-dq conversion unit 6, an estimation unit 7, subtractors 8, 9, adders 10, 11, a rotational position detector (pulse generator) 13, a first command generation unit 100 and a second command generation unit 200. The estimation unit 7 serves to estimate a torque and an induced voltage of a PM motor (Permanent Magnet Synchronous Motor) (hereinafter, referred to simply as motor) 12 as a rotary machine. The rotational position detector 13 detects a rotational position of the motor. The first command generation unit 100, as its details are shown in FIG. 2, has a processing unit 101, calculation units 102, 103, calculation units 105, 106, and an adder 107, and generates a first command for reducing a torque ripple. The processing unit 101 has an extraction unit 101a and a phase compensation unit 101b. The extraction unit 101a extracts a vibration component (a ripple component) of an estimation torque τ. Based on a compensation set value for compensating an estimation delay of the estimation torque τ from an actual torque, the phase compensation unit 101b compensates a phase of the vibration component of the estimation torque τ extracted at the extraction unit 101a (details will be described later). The calculation units 102, 103 calculate torque-ripple vibration reduction values. The calculation units 102, 103 have subtractors 102a, 103a and reduction control units 102b, 103b, respectively. The calculation units 105, 106 have signal generation units 105a, 106a and multipliers 105b, 106b. The signal generation units 105a, 106a generate periodic signals to thereby compensate, in combination, a control delay in a current control system. Note that the estimation unit 7, the first command generation unit 100 and the second command generation unit 200 correspond to a torque compensation unit according to the invention. Further, the first command generation unit 100 and the second command generation unit 200 serve also as a phase compensation unit according to the invention (details will be described later). The current control system according to the invention is constituted by the current control unit 2, the dq-to-three-phase conversion unit 3, the estimation unit 7 and the first command generation unit 100. The estimation unit 7 corresponds to a voltage estimation unit and a torque estimation unit according to the invention, and the dq-to-three-phase conversion unit 3 and the adder 11 correspond to a voltage command generation unit. The extraction unit 101a corresponds to a first extraction unit according to the invention, and the phase compensation unit 101b corresponds to a first phase compensation unit. The calculation units 102, 103 correspond to a first calculation unit according to the invention, and the calculation units 105, 106 correspond to a second calculation unit. The signal generation units 105a, 106a correspond to a second phase compensation unit according to the invention.

The second command generation unit 200, as its details are shown in FIG. 3, has a processing unit 201, calculation units 202, 203, an adder 204 and an adjustment unit 205, and generates a second command that is a torque-ripple compensation voltage command for reducing a torque ripple.

The processing unit 201 has an extraction unit 201a and a phase compensation unit 201b. The extraction unit 201a extracts a vibration component in the induced voltage. Based on a compensation set value for compensating an estimation delay of a q-axis induced-voltage estimation value eq from an actual voltage, the phase compensation unit 201b compensates a phase of the vibration component in the induced voltage extracted at the extraction unit 201a (details will be described later). The calculation units 202, 203 have signal generation units 202a, 203a and multipliers 202b, 203b, respectively, and calculate the second command. The signal generation units 202a, 203a generate periodic signals to thereby compensate a control delay in the current control system. The extraction unit 201a corresponds to a second extraction unit according to the invention, and the phase compensation unit 201b corresponds to a third phase compensation unit. The calculation units 202, 203 correspond to a third calculation unit according to the invention. The signal generation units 202a, 203a correspond to a fourth phase compensation unit according to the invention.

Next, operations will be described. In FIG. 1, a torque set value τ** and a phase-compensated first command τ*$_{rip}$ that is a torque-ripple compensation command (details will be described later) are added together at the adder 10, and then outputted (given) as a torque command τ* to the current command generation unit 1. At the current command generation unit 1, a q-axis current command iq* is calculated based on the torque command τ* and a motor constant, and then outputted to the subtractor 8. Further, at the current detection unit 5, an actual current vector i of the motor 12 is detected, and then outputted to the three-phase-to-dq conversion unit 6. Then, at the three-phase-to-dq conversion unit 6, a q-axis actual current iq and a d-axis actual current id are calculated based on the actual current vector i, and the q-axis actual current iq and the d-axis actual current id are outputted to the subtractor 8 and the subtractor 9, respectively.

At the subtractor 8, a difference between the q-axis current command iq* and the q-axis actual current iq is calculated, and then outputted to the current control unit 2. At the subtractor 9, a difference between a d-axis current command id* and the d-axis actual current id is calculated, and then outputted also to the current control unit 2. At the current control unit 2, a d-axis voltage command vd* and a q-axis voltage command vq* are calculated, and the d-axis voltage command vd* is outputted to the dq-to-three-phase conversion unit 3. Further, the q-axis voltage command vq* and a phase-compensated second command vq*$_{rip}$ (details will be described later) are added together at the adder 11, and then outputted to the dq-to-three-phase conversion unit 3. At the dq-to-three-phase conversion unit 3, a voltage command vector v* as a three-phase driving voltage command is calculated from the d-axis voltage command vd* and the q-axis voltage command vq*, and then outputted to the power converter 4. At the power converter 4, a three-phase voltage is outputted according to the voltage command vector v*, so that the motor 12 is driven so as to generate a torque equal to the torque command τ*.

While the foregoing is a summary of the operations, in this embodiment, compensation in control is performed based on the phase-compensated first command τ*$_{rip}$ and the phase-compensated second command vq*$_{rip}$ calculated by the estimation unit 7, the first command generation unit 100, the second command generation unit 200 and the like. Its details will be described below. At the estimation unit 7, an estimation voltage vector e as an estimation induced voltage of the motor is estimated according to the following calculation on the basis of the motor constant, the actual current vector i, the voltage command vector v* for the motor 12 and an electrical angle $\theta_{re}$ of the motor detected by the rotational position detector 13 such as an encoder, etc.

[Formula 1]

$$\frac{d\theta_{re}}{dt} = \omega_{re} = P_m\omega_{rm} \quad (1)$$

$$e = F(s)(v^* - ((R + pL)I + \omega_{re}LJ)i)$$

Here, R represents a winding resistance of the motor, L represents a self-inductance, Pm represents a number of pole pairs, p represents a differential operator, I represents an identity matrix, J represents an alternate matrix, F(s) represents a gain of a low-pass filter, $\omega_{rm}$ represents a mechanical angular speed, and $\omega_{re}$ represents an electrical angular speed. The gain F(s) is a transfer function of the low-pass filter implemented through software processing in the estimation unit 7 by, although not shown in the figure, a microprocessor.

Then, at the estimation unit 7, the estimation torque τ of the motor is estimated according to the calculation by the following formula (2) from the estimation voltage vector e, the actual current vector i and the electrical angular speed $\omega_{re}$. Note that, in the formula (2), $i^T$ is a transposed matrix of i.

[Formula 2]

$$\tau = \frac{i^T e}{\omega_{rm}} = \frac{P_m i^T e}{\omega_{re}} \quad (2)$$

Next, an operation of the first command generation unit 100 will be described with reference to FIG. 2. First, at the extraction unit 101*a*, a ripple component of the estimation torque τ is extracted. As a calculation method therefor, although any publicly known technique may be used, herein used as an example is the calculation by the following formula (3) in which a Fourier series development is referred to for the estimation torque τ.

[Formula 3]

$$\tau_{Cn} = 2F_{LPF}(s) \times \tau \times \cos(n\omega_{re}t + \Delta\theta_{\tau\text{-}est})$$

$$\tau_{Sn} = 2F_{LPF}(s) \times \tau \times \sin(n\omega_{re}t + \Delta\theta_{\tau\text{-}est}) \quad (3)$$

Here, $\tau_{Cn}$ is a cosine coefficient of the estimation torque τ, $\tau_{Sn}$ is a sine coefficient of the estimation torque τ, $F_{LPF}(s)$ is a gain of a low-pass filter, and n is an order of the torque ripple. $\Delta\theta_{\tau\text{-}est}$ is a phase-compensation set value for compensating an estimation delay of the estimation torque τ from an actual torque, which is set in the phase compensation unit 101*b*. The phase-compensation set value $\Delta\theta_{\tau\text{-}est}$ is pre-set by calculation based on an actual measurement and a model.

Next, as shown in detail in FIG. 2, the cosine coefficient $\tau_{Cn}$ and the sine coefficient $\tau_{Sn}$ are outputted to the subtractors 102*a*, 103*a* of the calculation unit 102, respectively. At the calculation units 102, 103 (the subtractors 102*a*, 103*a* and the reduction control units 102*b*, 103*b*), a torque-ripple compensation cosine coefficient $\tau_{Cn}$* and a torque-ripple compensation sine coefficient $\tau_{Sn}$* are calculated as torque-ripple vibration reduction values according to the calculation by the following formula (4), and outputted to the multipliers 105*b*, 106*b* of the calculation units 105, 106, respectively.

[Formula 4]

$$\tau_{Cn}^* = G_{rip}(s) \times (\tau_{Cn}^{**} - \tau_{Cn})$$

$$\tau_{Sn}^* = G_{rip}(s) \times (\tau_{Sn}^{**} - \tau_{Sn}) \quad (4)$$

Here, $G_{rip}(S)$ represents transfer characteristics of the reduction control units 102*b*, 103*b*, and $\tau_{Cn}$ and $\tau_{Sn}$ represent torque-ripple reduction command values.

At the multipliers 105*b*, 106*b* of the calculation units 105, 106 and the adder 107, the calculation by the formula (5) is performed, so that conversion is made into conversion signals synchronized with a cycle of the torque ripple and the first command $\tau^*_{rip}$ is outputted. Note that, at the signal generation units 105*a*, 106*a*, phase compensation ($\Delta\theta_i$) is performed based on the electrical angular speed $\omega_{re}$ of the motor 12, so that the conversion signals are generated. The compensation set value $\Delta\theta_i$ is pre-set by calculation based on an actual measurement and a model.

[Formula 5]

$$\tau_{rip}^* = \tau_{Cn}^* \cos(n\omega_{re}t + \Delta\theta_i) + \tau_{Sn}^* \sin(n\omega_{re}t + \Delta\theta_i) \quad (5)$$

$\Delta\theta_i$ represents a phase-compensation set value based on a control delay that is related to generation of the first command and that is due to the current control system including the power converter 4.

Next, a detailed operation of the second command generation unit 200 will be described with reference to FIG. 3. First, with respect to the q-axis induced-voltage estimation value eq in the estimation voltage vector e, the calculation by the following formula (6) is performed at the extraction unit 201*a* and the phase compensation unit 201*b*. $F_{LPF}(s)$ is a transfer function of the low-pass filter implemented through software processing in the extraction unit 201*a* by, although not shown in the figure, a microprocessor. Further, $\Delta\theta_{eq\text{-}est}$ is a compensation set value for compensating an estimation delay of the q-axis induced-voltage estimation value eq from an actual voltage, which is set by the phase compensation unit 201*b*. The compensation set value $\Delta\theta_{eq\text{-}est}$ is pre-set by calculation based on an actual measurement and a model.

[Formula 6]

$$eq_{Cn} = 2F_{LPF}(s) \times eq \times \cos(n\omega_{re}t + \Delta\theta_{eq\text{-}est})$$

$$eq_{Sn} = 2F_{LPF}(s) \times eq \times \sin(n\omega_{re}t + \Delta\theta_{eq\text{-}est}) \quad (6)$$

According to the formula (6), vibration components synchronized with the cycle of the torque ripple in the q-axis induced-voltage estimation value eq are extracted as Fourier coefficients $eq_{Cn}$, $eq_{Sn}$. Then, their values are outputted to the multipliers 202*b*, 203*b* of the calculation units 202, 203. Note that, at the signal generation units 202*a*, 203*a*, periodic signals having been subjected to phase compensation ($\Delta\theta_v$) based on the electrical angular speed $\omega_{re}$ of the motor 12 are generated. The compensation set value $\Delta\theta_v$ is pre-set by calculation based on an actual measurement and a model.

At the multipliers 202*b*, 203*b* of the calculation units 202, 203 and the adder 204, the calculation by the formula (7) is performed to thereby cause conversion into a periodic signal $eq_{rip}$ synchronized with the cycle of the torque ripple, which is then outputted to the adjustment unit 205.

[Formula 7]

$$eq_{rip} = eq_{Cn} \cos(n\omega_{re}t + \Delta\theta_v) + eq_{Sn} \sin(n\omega_{re}t + \Delta\theta_v) \quad (7)$$

Note that, $\Delta\theta_v$ represents a phase-compensation set value based on a control delay that is related to generation of the second command and that is due to the dq-to-three-phase conversion unit 3, the power converter 4, the estimation unit 7 and the processing unit 201.

For sake of simplicity, here is assumed that a proportional control as shown in the following formula (8) is performed at the adjustment unit 205. As shown for example by a bend line F in FIG. 4, the control parameter $KP(\omega_{re})$ is caused to vary depending on the electrical angular speed $\omega_{re}$ as the rotation speed of the rotary machine. Namely, at a low speed (in a low frequency range), because the current command value enough to reduce the torque ripple is outputted from the current control unit 2, the control parameter $Kp(\omega_{re})$ is made zero up to a given electrical angular speed (frequency) $\omega_1$, whereas in a range more than the above, in order to supplement the command value outputted from the current control unit 2 so as not to be decreased due to increase of the electrical angular speed, the control parameter $Kp(\omega_{re})$ is made to become larger in proportion to the electrical angular speed. This causes the second command $vq^*_{rip}$ that is matched to the rotation speed, to be outputted from the adjustment unit 205.

[Formula 8]

$$vq^*_{rip}=K_p(\omega_{re}) \times eq_{rip} \qquad (8)$$

In a manner described above, the first command $\tau^*_{rip}$ having been phase-corrected according to the estimation delay and the control delay in the control system, is outputted from the first command generation unit 100, and the second command $vq^*_{rip}$ having been phase-corrected likewise, is outputted from the second command generation unit 200.

Returning back to FIG. 1, at the adder 10, the first command $\tau^*_{rip}$ is added to the torque command $\tau^*$, and the resultant is outputted to the current command generation unit 1; and at the adder 11, the second command $vq^*_{rip}$ is added to the q-axis voltage command $vq^*$, and the resultant is outputted to the dq-to-three-phase converter 3. In this manner, the torque (current)) command $\tau^*$ and the q-axis voltage command $vq^*$ are compensated at the same time.

In a high speed range where the frequency range of the torque ripple exceeds the control-frequency range of the current control unit 2, if only the torque (current) command $\tau^*$ is compensated, its effect will be attenuated by the current control unit 2, so that the q-axis voltage command $vq^*$ of a high frequency enough to cause torque-ripple reduction is not outputted to the dq-to-three-phase converter 3. However, when the q-axis voltage command $vq^*$ is compensated at the same time, because a lack of the q-axis voltage command $vq^*$ in a high frequency range can be supplemented, it is possible to effectively cause torque ripple reduction even in a high speed range, so that a rotary machine controller capable of reducing the torque ripple over a wide range of speed can be achieved.

As is clear from the formula (3), the formula (5) and the formula (7), in this embodiment, since the estimation delay that the estimation torque has, and the control delay that the current control system has as a whole, are compensated independently, it becomes easy to adjust the phase compensation amount.

FIG. 5 is a chart for explaining about, as an example of a control delay, a phase delay produced in a motor drive system using a power converting means such as a power converter, etc. As shown in FIG. 5, even if a command Va as indicated by a black solid line is given to the dq-to-three-phase conversion unit 3 from the current control unit 2, what is actually inputted as an control input thereto is an average value (dotted-line waveform) Vc of a staircase waveform Vb. When the period in updating cycle of the actual voltage of the power converter is defined as T, the average value Vc on the dotted line is delayed from the command Va on the solid line by Ta+Tb=1.5T (Ta=T, Tb=0.5T) [sec] in time, namely, by $1.5T \times n\omega_{re}$[rad] in phase. Accordingly, when the control delay at the current control unit 2 is defined as $\angle\theta_i$ and the control delay at the reduction control units 102b, 103b is defined as $\angle\theta_{rip}$, then, the phase compensation amounts in the formula (5) and formula (7) can be—see, the following formula (9)

[Formula 9]

$$\Delta\theta_i = \angle\theta_i + \angle\theta_{rip} + 1.5T \times n\omega_{re}$$

$$\Delta\theta_v = 1.5T \times n\omega_{re} \qquad (9)$$

—selected as the above.

FIG. 6 is graphs showing a simulation result in a case where a torque-ripple reduction control is performed by the rotary machine controller shown in FIG. 1, provided that the rotary machine controller according to Embodiment 1 was attached to a motor model with 10 pole pairs having a torque ripple of a 6th-order component, the current control range was given as 2000 [rad/sec], and the motor 12 was controlled, from the load side, to rotate constantly at 1000 [r/min]. On this occasion, the torque-ripple frequency of the 6th-order component becomes about 6280 [rad/sec], so that its reduction is difficult according to the conventional art. During a section a, the first command generation unit 100 and the second command generation unit 200 are not operated, thus not performing reduction control. During a section b, only the first command generation unit 100 is operated, and finally, during a section c, the second command generation unit 200 is additionally operated, thus making a complete operation as the rotary machine controller according to Embodiment 1.

At 1000 [r/min] in a high speed range, it is found that, although the torque ripple is not fully reduced solely by the first command generation unit 100, when the second command generation unit 200 is operated in cooperation, a high reduction effect is achieved.

In this manner, according to this embodiment, the torque command and the q-axis voltage command are compensated at the same time using the first and second commands having been compensated in the control delay and the estimation delay, so that a lack of the q-axis voltage command $vq^*$ in a high frequency range is supplemented. Thus, such an effect is achieved that the torque ripple is reduced more effectively over a wide range of speed up to a high speed range.

In addition, according to the invention, because the first and second commands are generated based on the values compensated in a phase delay, such as the control delay and the estimation delay, it is possible to effectively reduce the torque ripple without performing a troublesome pre-work for measurement using a measurement facility.

Embodiment 2

The configuration in this embodiment is similar to that in Embodiment 1 shown in FIG. 1 to FIG. 6, so that its illustration is omitted. In this embodiment, like Embodiment 1, in the first command generation unit 100, there are performed the calculation by the formula (3) at the extraction unit 101a, the calculation by the formula (4) at the calculation units 102, 103, and the calculation by the formula (5) at the calculation units 105, 106; and in the second command generation unit 200, there are performed the calculation by the formula (6) at the extraction unit 201a, the calculation by the formula (7) at the calculation units 202, 203 and the adder 204, and the calculation by the formula (8)

at the adjustment unit 205; so that the commands for compensating an nth-order torque ripple are generated.

On this occasion, when, using mutually different natural numbers ni, nv (ni<nv), an order n of the torque ripple is set to ni at the first command generation unit 100, and the order n is set to nv at the second command generation unit, it is possible to cause these units to operate so as to compensate torque ripples of the different orders, respectively. Further, when the second command generation unit 200 is set so that it performs reduction of a torque ripple of a higher order, the reduction effect can be enhanced.

This makes it possible to switch the operation mode, for example, in such a manner that, in a low speed range where the torque ripple increases, for reducing both the 6-th order component and the 12-th order component that are major components of the torque ripple, ni=6, nv=12 are given so as to cause the units to operate to reduce the plural-order torque ripples, while in a high speed range where the torque ripple decreases but its reduction becomes difficult, attention is focused only on the 6-th order component that is the most major component, so that ni=nv=6 is given so as to cause the units to operate like Embodiment 1, to thereby enhance the reduction effect of the 6th-order component.

In this manner, according to this embodiment, like Embodiment 1, an effect is achieved that a torque ripple reduction is made possible in a high speed range; and when a reduction-target order (frequency) of the torque ripple is set independently in each of the first command generation unit 100 and the second command generation unit 200, an effect is achieved that a proper torque-ripple reduction is made possible according to the motor characteristic and/or its driving condition.

Embodiment 3

Figure 7:
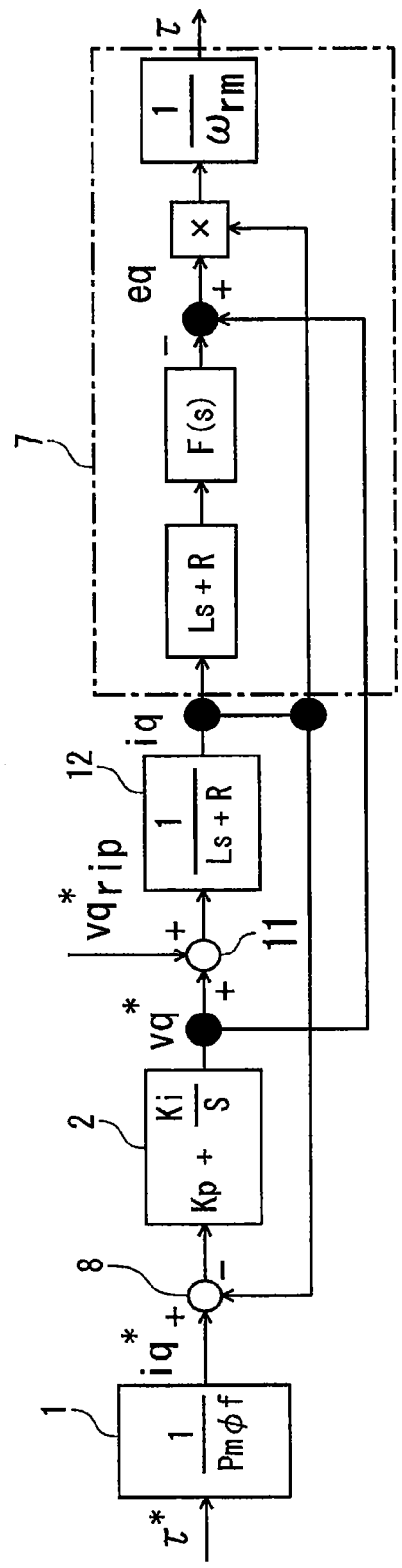
FIG. 7 is a block diagram showing a mathematical mode 1 of a current control system, for explaining operations in Embodiment 3 of the invention.

The configuration in this embodiment is similar to that in Embodiment 1 shown in FIG. 1 to FIG. 6, so that its illustration is omitted. Note that FIG. 7 is a block diagram showing a mathematical model of a current control system, for explaining operations in this embodiment. In this embodiment, like Embodiment 1 and Embodiment 2, in the first command generation unit 100, there are performed the calculation by the formula (3) at the extraction unit 101a, the calculation by the formula (4) at the calculation units 102, 103, and the calculation by the formula (5) at the calculation units 105, 106; and in the second command generation unit 200, there are performed the calculation by the formula (6) at the extraction unit 201a, the calculation by the formula (7) at the calculation units 202, 203 and the adder 204, and the calculation by the formula (8) at the adjustment unit 205; so that the first and second commands for compensating an nth-order torque ripple are generated.

Meanwhile, as a mathematical model on the q-axis, a transfer characteristic of the current control system including the estimation unit 7 is given as in FIG. 7. Namely, there are provided: as a transfer function of the current command generation unit 1, $$1/P_m\Phi_f;$$

as a transfer function of the current control unit 2, $$K_p+K_i/s;$$

as a transfer function of the motor 12, $$1/(Ls+R);$$

and, as a transfer function for a voltage drop portion in the estimation unit 7 in FIG. 7, $$F(s)(Ls+R).$$

Here, the q-axis voltage command value vq* is given as $$vq^* = vq_{rip}^* + (Ls+R)iq$$

and the q-axis induced-voltage estimation value eq is calculated by subtracting the voltage drop portion from the voltage command value vq*. This provides:

$$eq = vq^* - F(s)(Ls+R)iq$$

Accordingly, in consideration also of a transfer characteristic from $vq^*_{rip}$ to iq, a transfer characteristic Gv(s) up to the calculation of the q-axis induced-voltage estimation value eq using the second command $vq^*_{rip}$ as an input, can be—

[Formula 10]

$$G_v(s) = \frac{(K_P s + K_i) + F(s)(Ls^2 + Rs)}{Ls^2 + (K_P + R)s + K_i} \quad (10)$$

—calculated as the above. Thus, based on the formula (10), at the calculation units 202, 203 of the second command generation unit 200 in FIG. 3, the formula—

[Formula 11]

$$\Delta\theta_v = (1.5T \times n\omega_{re}) + \angle G_v(jn\omega_{re}) \quad (11)$$
$$K_p(\omega_{re}) = \frac{1}{|G_v(jn\omega_{re})|}$$

—can be set. Note that j represents an imaginary unit.

In this manner, according to this embodiment, the phase compensation value $\Delta\theta_v$ at the second command generation unit 200 and the amount for adjustment $Kp(\omega_{re})$ at the adjustment unit 205 are determined by the calculation based on the mathematical model of the control system, and $eq_{rip}$ and the second command $vq^*_{rip}$ are calculated based on the formula (7) and the formula (8), so that there is an effect of making it easy to adjust the control system.

Note that, in the foregoing embodiments, such cases are shown where the first command $\tau_{rip}$ calculated at the first command generation unit 100 is added to the torque command τ* at the adder 10 (see, FIG. 1); instead, a result from converting the first command $\tau^*_{rip}$ outputted from the first command generation unit 100 into a q-axis current, may be added to the q-axis current command iq*.

Further, unlimited combination of the aforementioned respective embodiments, and any appropriate modification or omission in the respective embodiments may be made in the present invention without departing from the scope of the invention.

The invention claimed is:

1. A rotary machine controller which comprises a torque compensation unit, a current control unit, a voltage command generation unit and a phase compensation unit, and controls a rotary machine using a driving voltage that is applied thereto through a power converter according to a three-phase driving-voltage command outputted from the voltage command generation unit, wherein the torque compensation unit has a voltage estimation unit, a torque estimation unit, a first command generation unit and a second command generation unit, and wherein:

the voltage estimation unit serves to estimate an estimation induced voltage of the rotary machine on the basis of an actual current flowing in the rotary machine and the driving voltage;

the torque estimation unit serves to estimate an estimation torque of the rotary machine on the basis of the estimation induced voltage and the actual current;

the first command generation unit serves to generate a first command for reducing a torque ripple of the rotary machine, on the basis of the estimation torque;

the second command generation unit serves to generate a second command for reducing the torque ripple of the rotary machine, on the basis of the estimation induced voltage;

the current control unit serves to compensate using the first command, a difference between a q-axis current command for ordering a current to be supplied from the power converter to the rotary machine and the actual current to thereby generate a q-axis voltage command;

the voltage command generation unit serves to compensate the q-axis voltage command using the second command to thereby generate the three-phase driving-voltage command on the basis of the compensated q-axis voltage command, and to reduce the torque ripple of the rotary machine having a frequency that exceeds a control-frequency range of the current control unit; and the phase compensation unit serves to compensate at least one of the first command and the second command using at least one of a preset phase-compensation set value which compensates a control delay in a current control system including the current control unit and the first command generation unit, and a preset phase-compensation set value which compensates an estimation delay in the torque estimation unit to thereby compensate at least one of the control delay in the current control system including the current control unit and the first command generation unit and the estimation delay in the torque estimation unit.

2. The rotary machine controller of claim 1, wherein, in the first command generation unit and the second command generation unit, a reduction-target frequency of the torque ripple by the first command generation unit and a reduction-target frequency of the torque ripple by the second command generation unit are provided as different frequencies.

3. The rotary machine controller of claim 1, wherein, in the first command generation unit and the second command generation unit, a reduction-target frequency of the torque ripple by the first command generation unit and a reduction-target frequency of the torque ripple by the second command generation unit are provided so as to be changeable independently.

4. The rotary machine controller of claim 1, wherein the second command generation unit has an adjustment unit, and the adjustment unit serves to change a magnitude of a command value of the second command according to a rotation speed of the rotary machine.

5. The rotary machine controller of claim 1, wherein the first command generation unit has a first extraction unit, a first calculation unit and a second calculation unit, and wherein:

the first extraction unit serves to extract a vibration component of the torque ripple in the estimation torque;

the first calculation unit serves to calculate a torque-ripple-vibration reduction value from a difference between the extracted vibration component of the torque ripple and a reduction command value; and the second calculation unit serves to convert the torque-ripple-vibration reduction value into a conversion signal synchronized with a cycle of the torque ripple, and generate the first command on the basis of the conversion signal.

6. The rotary machine controller of claim 5, wherein the phase compensation unit serves to compensate the first command, and has a first phase compensation unit and a second phase compensation unit;

the first phase compensation unit compensates a phase of the vibration component of the torque ripple using the preset phase-compensation set value which compensates the estimation delay in the torque estimation unit to thereby compensate the estimation delay of the estimation torque; and the second phase compensation unit compensates a phase of the conversion signal using the preset phase-compensation set value which compensates the control delay in the current control system including the current control unit to thereby compensate the control delay in the current control system.

7. The rotary machine controller of claim 1, wherein the second command generation unit has a second extraction unit and a third calculation unit, and wherein:

the second extraction unit serves to extract a vibration component in the estimation induced voltage at a frequency of the torque ripple; and the third calculation unit serves to convert the extracted vibration component in the estimation induced voltage into a synchronous signal synchronized with a cycle of the torque ripple, and generate the second command on the basis of the synchronous signal.

8. The rotary machine controller of claim 7, wherein the phase compensation unit serves to compensate the second command, and has a third phase compensation unit and a fourth phase compensation unit;

the third phase compensation unit serves to compensate a phase of the vibration component in the estimation induced voltage using the preset phase-compensation set value which compensates the estimation delay in the torque estimation unit to thereby compensate the estimation delay of the estimation torque; and the fourth phase compensation unit serves to compensate a phase of the synchronous signal using the preset phase-compensation set value which compensates the control delay in the current control system including the current control unit to thereby compensate the control delay in the current control system.

9. The rotary machine controller of claim 8, wherein, when a half cycle of a carrier at the voltage command generation unit is given as T[sec], an order of the torque ripple is given as n, and an electrical angular speed of the rotary machine is given as $\omega_{re}$[rad/sec], the fourth phase compensation unit provides a phase compensation amount $\Delta\theta$[rad] for the second command as $\Delta\theta=1.5\ T\times n\omega_{re}$ so as to compensate the control delay that the voltage command generation unit has.

10. The rotary machine controller of claim 8, wherein the fourth phase compensation unit serves to calculate a mathematical-model phase-compensation amount on the basis of a mathematical model of a transfer characteristic of the current control system, and compensate the phase of the synchronous signal on the basis of the mathematical-model phase-compensation amount, to thereby compensate the control delay in the current control system.

11. The rotary machine controller of claim 2, wherein the first command generation unit has a first extraction unit, a first calculation unit and a second calculation unit, and wherein:
- the first extraction unit serves to extract a vibration component of the torque ripple in the estimation torque;
- the first calculation unit serves to calculate a torque-ripple-vibration reduction value from a difference between the extracted vibration component of the torque ripple and a reduction command value; and
- the second calculation unit serves to convert the torque-ripple-vibration reduction value into a conversion signal synchronized with a cycle of the torque ripple, and generate the first command on the basis of the conversion signal.

12. The rotary machine controller of claim 3, wherein the first command generation unit has a first extraction unit, a first calculation unit and a second calculation unit, and wherein:
- the first extraction unit serves to extract a vibration component of the torque ripple in the estimation torque;
- the first calculation unit serves to calculate a torque-ripple-vibration reduction value from a difference between the extracted vibration component of the torque ripple and a reduction command value; and
- the second calculation unit serves to convert the torque-ripple-vibration reduction value into a conversion signal synchronized with a cycle of the torque ripple, and generate the first command on the basis of the conversion signal.

13. The rotary machine controller of claim 4, wherein the first command generation unit has a first extraction unit, a first calculation unit and a second calculation unit, and wherein:
- the first extraction unit serves to extract a vibration component of the torque ripple in the estimation torque;
- the first calculation unit serves to calculate a torque-ripple-vibration reduction value from a difference between the extracted vibration component of the torque ripple and a reduction command value; and
- the second calculation unit serves to convert the torque-ripple-vibration reduction value into a conversion signal synchronized with a cycle of the torque ripple, and generate the first command on the basis of the conversion signal.

14. The rotary machine controller of claim 11, wherein the phase compensation unit serves to compensate the first command, and has a first phase compensation unit and a second phase compensation unit;
- the first phase compensation unit compensates a phase of the vibration component of the torque ripple using the preset phase-compensation set value which compensates the estimation delay in the torque estimation unit to thereby compensate the estimation delay of the estimation torque; and
- the second phase compensation unit compensates a phase of the conversion signal using the preset phase-compensation set value which compensates the control delay in the current control system including the current control unit to thereby compensate the control delay in the current control system.

15. The rotary machine controller of claim 12, wherein the phase compensation unit serves to compensate the first command, and has a first phase compensation unit and a second phase compensation unit;
- the first phase compensation unit compensates a phase of the vibration component of the torque ripple using the preset phase-compensation set value which compensates the estimation delay in the torque estimation unit to thereby compensate the estimation delay of the estimation torque; and
- the second phase compensation unit compensates a phase of the conversion signal using the preset phase-compensation set value which compensates the control delay in the current control system including the current control unit to thereby compensate the control delay in the current control system.

16. The rotary machine controller of claim 2, wherein the second command generation unit has a second extraction unit and a third calculation unit, and wherein:
- the second extraction unit serves to extract a vibration component in the estimation induced voltage at a frequency of the torque ripple; and
- the third calculation unit serves to convert the extracted vibration component in the estimation induced voltage into a synchronous signal synchronized with a cycle of the torque ripple, and generate the second command on the basis of the synchronous signal.

17. The rotary machine controller of claim 3, wherein the second command generation unit has a second extraction unit and a third calculation unit, and wherein:
- the second extraction unit serves to extract a vibration component in the estimation induced voltage at a frequency of the torque ripple; and
- the third calculation unit serves to convert the extracted vibration component in the estimation induced voltage into a synchronous signal synchronized with a cycle of the torque ripple, and generate the second command on the basis of the synchronous signal.

18. The rotary machine controller of claim 4, wherein the second command generation unit has a second extraction unit and a third calculation unit, and wherein:
- the second extraction unit serves to extract a vibration component in the estimation induced voltage at a frequency of the torque ripple; and
- the third calculation unit serves to convert the extracted vibration component in the estimation induced voltage into a synchronous signal synchronized with a cycle of the torque ripple, and generate the second command on the basis of the synchronous signal.

19. The rotary machine controller of claim 16, wherein the phase compensation unit serves to compensate the second command, and has a third phase compensation unit and a fourth phase compensation unit;
- the third phase compensation unit serves to compensate a phase of the vibration component in the estimation induced voltage using the preset phase-compensation set value which compensates the estimation delay in the torque estimation unit to thereby compensate the estimation delay of the estimation torque; and
- the fourth phase compensation unit serves to compensate a phase of the synchronous signal using the preset phase-compensation set value which compensates the control delay in the current control system including the current control unit to thereby compensate the control delay in the current control system.

20. The rotary machine controller of claim 17, wherein the phase compensation unit serves to compensate the second command, and has a third phase compensation unit and a fourth phase compensation unit;
- the third phase compensation unit serves to compensate a phase of the vibration component in the estimation induced voltage using the preset phase-compensation set value which compensates the estimation delay in the torque estimation unit to thereby compensate the estimation delay of the estimation torque; and the fourth phase compensation unit serves to compensate a phase of the synchronous signal using the preset phase-compensation set value which compensates the control delay in the current control system including the current control unit to thereby compensate the control delay in the current control system.

* * * * *